United States Patent [19]

Roth

[11] Patent Number: 5,173,116

[45] Date of Patent: Dec. 22, 1992

[54] PREPARATION OF READILY DISPERSIBLE PIGMENT GRANULES

[75] Inventor: Karl Roth, Limburgerhof, Fed. Rep. of Germany

[73] Assignee: BASF Aktiengesellschaft, Ludwigshafen, Fed. Rep. of Germany

[21] Appl. No.: 871,077

[22] Filed: Apr. 20, 1992

[30] Foreign Application Priority Data

Apr. 24, 1991 [DE] Fed. Rep. of Germany ....... 4113318

[51] Int. Cl.$^5$ .......................... C09C 3/04; C09C 3/08; C09C 3/10; C09C 3/12
[52] U.S. Cl. ................................... 106/401; 106/400; 106/499
[58] Field of Search ........................ 106/400, 401, 499

*Primary Examiner*—Mark L. Bell
*Assistant Examiner*—Scott L. Hertzog
*Attorney, Agent, or Firm*—Oblon, Spivak, McClelland, Maier & Neustadt

[57] ABSTRACT

Readily dispersible pigment granules are prepared by dispersing, in an aqueous suspension of the pigment, by thorough stirring, a gas which does not react with the suspension in fine bubbles under essentially atmospheric pressure and converting the resulting pigment suspension into pigment granules by spray drying or by mechanical removal of the liquid, shaping of the still moist pigment cake and subsequent drying.

3 Claims, No Drawings

PREPARATION OF READILY DISPERSIBLE PIGMENT GRANULES

The present invention relates to a novel process for preparing readily dispersible pigment granules.

Pigments in granule form are superior to the same pigments in powder form as regards dust nuisance and ease of flow in the case of container deliveries and hence are of increasing interest in particular in the printing ink and surface coating sector.

Low-dust pigmentary forms can be prepared in various ways. For example, the pigment press cake can be forced through a perforated plate and then dried. This produces strand granules from about 0.3 to 0.8 cm in thickness and from 0.5 to 2 cm in length.

Dried piece material can be reduced to the desired particle size by means of a screen comminutor. However, this produces a heterogeneous particle size spectrum with the mesh size of the screen as upper particle size.

By coating the surface of pigments with, for example, mineral oils, resins or phthalic esters it is likewise possible to obtain dustless products, but they must be known to be compatible with the substrate to be pigmented.

Finally, bead granules can be prepared by selecting a specific choice of solvent for the grinding, for example by mixing a water-insoluble organic solvent with water or by adding salt to water-soluble organic solvents.

However, all the pigmentary forms mentioned are distinctly inferior to pigment powders in dispersibility.

It is an object of the present invention to prepare low-dust but also readily dispersible pigmentary forms.

We have found that this object is achieved by a novel process for preparing readily dispersible pigment granules which comprises dispersing, in an aqueous suspension of the pigment, by thorough stirring, a gas which does not react with the suspension in fine bubbles under essentially atmospheric pressure and converting the resulting pigment suspension into pigment granules by spray drying or by mechanical removal of the liquid, shaping of the still moist pigment cake and subsequent drying.

The process of the invention is particularly preferably carried out with air as the gas which does not react with the suspension. Examples of other suitable gases are nitrogen and carbon dioxide.

The process of the invention makes it possible to prepare readily dispersible granules of any organic or inorganic pigment. It is of particular interest for those pigments that are used in printing inks or surface coatings. Examples are the Heliogen® and Lithol® brands.

The process of the invention is conveniently carried out by introducing air into the pigment suspension in a dispersing machine in general at a rate of from 0.5 to 3 $m^3$, preferably from 1 to 1.5 $m^3$, of air per $m^3$ of suspension and uniformly dispersing the air in the suspension in the form of fine bubbles $<20$ $\mu m$ in size by intensive stirring with an energy input of for example up to 0.5 kWh/kg of suspension.

The dispersing machine employed may be not only of the batch type but also of the continuous type such as an Ultra-Turrax or a Dispax reactor. If a Dispax reactor is used, the process will in general be carried out with compressed air at about 1–3 bar, as will be ordinarily available, while an Ultra-Turrax automatically sucks in the ambient air from the outside.

A particular advantage of the process of the invention is that, during and after the gassing, the pigment suspension can be handled under atmospheric pressure.

The subsequent removal of liquid and drying of the pigment are carried out according to existing methods, either by spray drying, in which case the gassed pigment suspension is injected downward into a prill tower, hot gas such as air or nitrogen is introduced upward in countercurrent and the pigment granules then descend as small spherical shapes, or by mechanical removal of the liquid, for example by filtration, shaping of the resulting pigment press cake, which has a residual moisture content of in general from 50 to 80% by weight of water, by a mold press, for example into strands, and subsequent belt or cabinet drying.

It is an essential requirement of the invention that the air bubbles dispersed in the suspension remain in the press cake, so that the drying process leaves voids in the granules which, compared with an ungassed sample, bring about an increase in volume of in general up to 150%, in particular of from 50 to 100%. These voids are readily penetrated by binder, and the granules readily fall apart on dispersion of the pigment.

This effect, for which it is enough to disperse air in the pigment suspension, can be enhanced by adding a resin, although it is to be noted that excessive resin can have an adverse effect on the color strength.

Suitable resins are those which are customarily used for preparing pigment preparations, in particular rosin and derivatives thereof but also reaction products with maleic or fumaric anhydride and alkyd resins.

In general, the amount of resin which can be added will range from 5 to 30% by weight, preferably from 10 to 20% by weight, based on the pigment. The resin can be added to the pigment suspension as a resin soap, i.e. in the form of an alkaline solution, for example in sodium hydroxide solution, and, after the gassing, be precipitated by the addition of mineral acids such as sulfuric acid or organic acids such as acetic acid, or be added directly in a very finely precipitated form at the gassing stage.

Of course, the pigment suspension may also contain further additives. Examples are customarily employed dispersants such as polyhydroxystearic acids and derivatives thereof (Solsperse® products from ICI), paraffins, Turkey Red and Disperse Blue (salt of tris(dimethylaminomethylene) copper phthalocyanine and dodecylbenzenesulfonic acid).

The process of the invention makes it possible to prepare pigment granules which are not only low-dust but also readily dispersible in a technically simple manner. The pigment granules are readily predispersible in binders, so that bead or three-roll milling does not present any problems.

EXAMPLE 1

An approximately 5% by weight aqueous Lithol® Rubine pigment suspension (Colour Index C.I. 15850) was treated in air with an Ultra-Turrax unit from Janke und Kunkel (Stauffen/Breisgau) for 5 min, doubling the volume of the suspension.

The loose press cake obtained on filtering off with suction and washing was press-molded into strands and dried at 80° C. for 10 h. The dried low-dust granules had twice the bulk volume compared with an untreated sample. The granules disintegrated readily on grinding in an offset varnish and were very quick to develop the full color strength of the pigment.

EXAMPLE 2

Example 1 was repeated, except that the Ultra-Turrax treatment was accompanied by the addition of 100% by weight, based on the pigment, of a 10% by weight aqueous rosin resin soap solution (sodium salt), which was subsequently precipitated by addition of acetic acid to a pH of about 5.5.

The granular product obtained had slightly improved properties compared with the product of Example 1 and, after minimal predispersion in an offset varnish, was readily processible on a three-roll mill.

The table below shows measurements concerning the dispersibility of Lithol Rubine samples of Examples 1 and 2 and also of an untreated comparative sample following 10 minute predispersion in a Dispermat dissolver (toothed disk 3 cm in diameter, 12,000 rpm) at 70° C. and subsequent grinding on an SDY 200 three-roll mill from Bühler at 35° C. under various nip pressures.

The offset varnish used here contained 38% by weight of a phenol-modified rosin (Alresat ® SKA from Albert, Wiesbaden), 42% by weight of refined linseed oil and 20% by weight of mineral oil PKWF 6/9 (from Haltermann, Hamburg). The weight ratio of varnish to pigment was in each case 4.6:1.

The measurement scale ranges from 1 (poor; agglomerates >100 μm) to 7 (very good; agglomerates <5 μm).

TABLE

|  | Dispermat 10 min | Three-roll mill | | |
|---|---|---|---|---|
|  |  | 1 × 10 bar | 2 × 10 bar | 3 × 10 bar |
| Example 1 | 2 | 6 | 7 | 7 |
| Example 2 | 4 | 7 | 7 | 7 |
| Comparative sample | 1 | 5 | 6 | 7 |

EXAMPLE 3

A Heliogen ® Blue pigment press cake (C.I. 74 160) was adjusted with water to a stirrable consistency (solids content about 5–10% by weight). The pigment suspension obtained was pumped with a Mohno pump into a DR 366 Dispax reactor from Janke und Kunkel (Stauffen/Breisgau) and at the same time 1 m³ of air was fed into the dispersing machine per m³ of suspension, doubling the volume of the suspension.

The rest of the processing was carried out as described in Example 1.

The granular product obtained had twice the bulk volume of an untreated sample. It was quick to develop its color strength in offset varnish and was satisfactorily grindable not only in a stirred ball mill but also on a three-roll mill.

EXAMPLE 4

A 1.5 m³ spray dryer was supplied at the top by a Mohno pump through a 0.5 mm nozzle in the course of 60 min with 2 l of an 8% by weight aqueous Heliogen Blue pigment suspension which had been treated in air with an Ultra-Turrax unit for 10 min. At the same time hot air at about 180° C. was blown at 1.5 bar into the spray zone.

On drying, the atomized pigment suspension formed small spherical particles about 50–200 μm in diameter, which were carried by the airstream into a cyclone, where they were separated off.

The microgranular product obtained was low in dust, free-flowing and readily dispersible in printing ink and surface coating compositions.

We claim:

1. A process for preparing readily dispersible pigment granules which comprises dispersing, in an aqueous suspension of the pigment, by thorough stirring, a gas which does not react with the suspension, in fine bubbles under essentially atmospheric pressure and converting the resulting pigment suspension into pigment granules by spray drying or by mechanical removal of the liquid, shaping of the resulting still-moist pigment cake and subsequent drying.

2. A process as claimed in claim 1, wherein air is used as the gas which does not react with the suspension.

3. A process as claimed in claim 1, wherein the aqueous suspension of the pigment contains a resin which is customarily used for preparing pigment preparations.

* * * * *